United States Patent [19]

Bacon

[11] 3,947,281

[45] Mar. 30, 1976

[54] HIGH MODULUS RARE EARTH AND BERYLLIUM CONTAINING SILICATE GLASS COMPOSITIONS

[75] Inventor: James F. Bacon, Manchester, Conn.

[73] Assignee: United Technologies Corporation, Hartford, Conn.

[22] Filed: June 2, 1972

[21] Appl. No.: 259,056

Related U.S. Application Data

[63] Continuation-in-part of Ser. No. 874,675, Nov. 6, 1969, abandoned.

[52] U.S. Cl. ................................. 106/52; 106/50
[51] Int. Cl.² ...................... C03C 3/04; C03C 13/00
[58] Field of Search .............................. 106/50, 52

[56] References Cited
UNITED STATES PATENTS

| | | | |
|---|---|---|---|
| 2,805,166 | 9/1957 | Löffler | 106/52 |
| 3,127,277 | 3/1964 | Tiede | 106/50 |
| 3,483,072 | 12/1969 | Cox et al. | 106/50 UX |
| 3,573,078 | 3/1971 | Bacon | 106/50 |
| 3,597,246 | 8/1971 | McMarlin | 106/50 |
| 3,620,787 | 11/1971 | McMarlin | 106/50 |
| 3,814,611 | 6/1974 | Dumbaugh, Jr. | 106/52 |

OTHER PUBLICATIONS

Loewenstein, K. L., "Studies in the Composition and Structure of Glasses Possessing High Young's Moduli" – Phys. & Chem of Glasses, 2 (3), June 1961, pp. 69–82.

Tiede, R. L., "High Modulus Glass Fibers for Structural Plastics" – Glass Ind, Dec. 1960, pp. 699–700, 717–718.

*Primary Examiner*—Helen M. McArthur
*Assistant Examiner*—Mark Bell
*Attorney, Agent, or Firm*—John D. Del Ponti

[57] ABSTRACT

Glass compositions having a Young's modulus of at least 16 million psi and a specific modulus of at least 110 million inches consisting essentially of approximately, by weight, 20–43% $SiO_2$, 8–21% $Al_2O_3$, 4–10% BeO, 27–58% of at least one oxide selected from a first group consisting of $Y_2O_3$, $La_2O_3$, $Nd_2O_3$, $Ce_2O_3$ and the mixed rare earth oxides and 3–12% of at least one oxide selected from a second group consisting of MgO, $ZrO_2$, ZnO and CaO, the molar ratio of BeO to the total content of said first group oxides being from 1.0–3.0.

12 Claims, No Drawings

HIGH MODULUS RARE EARTH AND BERYLLIUM CONTAINING SILICATE GLASS COMPOSITIONS

BACKGROUND OF THE INVENTION

This is a continuation-in-part of application Ser. No. 874,675 filed Nov. 6, 1969, now abandoned by the same inventor.

The invention described herein was made in the performance of work under NASA contract and is subject to the provisions of Section 305 of the National Aeronautics and Space Act of 1958, Public Law 85-568 (72 Stat. 435; 42 USC 2457).

This invention in general relates to high modulus glass and glass compositions and more particularly relates to beryllia containing glasses having a Young's modulus of at least 16 million psi and a specific modulus of at least 110 million inches, some having a liquidus-viscosity relationship suitable for fiberization.

In the present age, there has been a continuing search for glasses of high modulus and low density, capable for use as reinforcements, preferably in fiber form in composite structures such as those ranging from high strength missile cases and helicopter blades to propeller spinners and gas turbine engine parts. Glass offers promise as the reinforcement in such applications since it may be quickly and cheaply produced by relatively conventional techniques and, generally, presents no compatability problems with the matrix materials with which it is normally used. There is a need however to provide glass formulations which possess a high modulus of elasticity, and particularly a high modulus-density ratio. It is even more preferable if the glass possesses the aforementioned two characteristics in combination with an appropriate liquidus-viscosity relationship to permit fiberization.

There is disclosed in my copending application Ser. No. 683,465 filed on Nov. 16, 1967, now U.S. Pat. No. 3,573,078, glass compositions comprising silica, alumina and magnesia with substantial quantities of an uncommon oxide such as lanthana, ceria or yttria which provide a formulation capable of fiberization to produce filaments having a high modulus of elasticity. It has now been found that the fiberizing properties of this type of glass composition, which shal be referred to as rare earth or zirconia-cordierite base glasses, may be most markedly enhanced by including beryllia in a similar type glass and maintaining its content in a particular molar ratio to the total content of yttria, lanthana, neodymia, ceria and mixed rare earth oxides present.

SUMMARY OF THE INVENTION

The glass compositions of the present invention are a high modulus, low density glass which, in their preferred form consist essentially of a combination of silica, beryllia, alumina, one or more oxides selected from a first group consisting of yttria, lanthana, neodymia, ceria and the mixed rare earth oxides and one or more oxides selected from a second group consisting of magnesia, zirconia, zinc oxide and calcia, with the molar ratio of beryllia to the total content of the first group oxides being 1.0–3.0. In particular, the inventive glasses contemplated are those having a Young's modulus of at least 16 million psi and a specific modulus of at least 110 million inches which consist essentially of, by weight, approximately 20–43% $SiO_2$, 4–10% BeO, 8–21% $Al_2O_3$, 27–58% of at least one oxide selected from a first group consisting of $Y_2O_3$, $La_2O_3$, $Nd_2O_3$, $Ce_2O_3$ and the mixed rate earth oxides and 3–12% of at least one oxide selected from a second group consisting of MgO, $ZrO_2$, ZnO and CaO, the molar ratio of BeO to the total content of the first group oxides being from 1.0 to 3.0. In general, there are not more than two first group oxides nor more than three second group oxides in a given glass composition.

In several preferred embodiments, formulations having a Young's modulus ranging from at least 16 to at least 21 million psi and a specific modulus ranging from at least 120 to at least 160 million inches that are readily formed into fibers having a relatively high fiber modulus ranging from above 15 to above 19 million psi are described. These include glasses consisting essentially of, by weight, approximately:

37% $SiO_2$, 8% BeO, 10% $Al_2O_3$, 33% $La_2O_3$ and 12% $ZrO_2$;
30% $SiO_2$, 8% BeO, 16% $Al_2O_3$, 34% $Y_2O_3$ and 12% ZnO;
36% $SiO_2$, 5% BeO, 21% $Al_2O_3$, 30% $Y_2O_3$ and 8% MgO;
38% $SiO_2$, 8% BeO, 11% $Al_2O_3$, 34% $La_2O_3$ and 9% ZnO;
37% $SiO_2$, 8% BeO, 10% $Al_2O_3$, 33% $La_2O_3$ and 12% $ZrO_2$;
31% $SiO_2$, 8% BeO, 16% $Al_2O_3$, 30% $Y_2O_3$, 9% $Ce_2O_3$ and 6% MgO;
30% $SiO_2$, 8% BeO, 16% $Al_2O_3$, 29% $Y_2O_3$, 8% $Ce_2O_3$, 3% MgO and 6% ZnO;
30% $SiO_2$, 8% BeO, 15% $Al_2O_3$, 29% $Y_2O_3$, 8% $Ce_2O_3$, 6% ZnO and 4% CaO;
30% $SiO_2$, 8% BeO, 16% $Al_2O_3$, 29% $Y_2O_3$, 8% $Ce_2O_3$, 2% MgO, 4% ZnO and 3% CaO;
32% $SiO_2$, 4% BeO, 18% $Al_2O_3$, 39% mixed rare earth oxides and 7% MgO;
32% $SiO_2$, 4% BeO, 18% $Al_2O_3$, 39% $La_2O_3$ and 7% MgO; and
33% $SiO_2$, 8% BeO, 11% $Al_2O_3$, 36% $La_2O_3$, 4% $Nd_2O_3$ and 8% MgO.

The features of the invention will be discussed in greater detail in the description which follows or will be evident therefrom to those skilled in the art.

DESCRIPTION OF THE PREFERRED EMBODIMENTS

In a generic sense, the glasses of the present invention may be characterized as of the cordierite variety ($Mg_2Al_4Si_5O_{18}$-a three-dimensional ring-former), but with the inclusion of beryllia and with the addition of substantial amounts of oxides selected from the group consisting of yttria, lanthana, ceria, neodymia and mixed rare earth oxides, this addition in some instances being so large as to equal or exceed the contributed weight of the cordierite components.

In the preliminary work only pure materials, particularly those of lanthana, ceria, zirconia and beryllia were utilized so that the characterization and property data could be unequivocally interpreted. In later experiments much less costly and impure formulations were substituted, such as would be used in actual glass-making operations. The normal impurities found in the less pure starting materials, including some of the less common rare earths, have been found to exert no significant detrimental effect on the properties of the desired end product when present in the normal amounts.

With repsect to the form of the materials added, it has been the practice to add the ceria, lanthana, yttria, neodymia and mixed rare earths as oxalates, the zirconia, beryllia, zinc and calcium as carbonates, and the other materials as oxides. Any form of the addition is satisfactory, however, as long as it is reducible in the melt to the oxide. And the addition of the ingredients in a form which provides some gas evolution during the melting operation furnishes an advantageous stirring or "fining" effect in the melt.

Many of the inventive glasses are capable of fiberization which is the ability of the glass to be readily drawn into filamentary form. In general, therefore, the glasses over a reasonable temperature range, depending on the particular composition, will display a viscosity of approximately 20,000 poises, the optimum viscosity being about 300–1,000 poises.

Typically, the glasses were prepared in 500 gram batches in high purity (99.9%) alumina crucibles in a Super-Kanthal hairpin kiln. The starting materials were 5 micron particle size high purity silica, 325 mesh high purity alumina, high purity precipitated magnesia, high purity lump-free beryllium carbonate, high purity precipitated zinc carbonate, zirconium carbonate, lithium carbonate and calcium carbonate, lanthanum, yttrium and/or cerium oxalates of 99% purity and a mixed rare earth oxalate of which a typical sample analyzed as:

| $Re_2(C_2O_4)_3 \cdot x H_2O$ | |
|---|---|
| % Oxides in Oxalate (by weight) | |
| $La_2O_3$ | 11.2 |
| *$CeO_2$ | 22.6 |
| $Pr_6O_{11}$ | 2.4 |
| $Nd_2O_3$ | 8.0 |
| $Sm_2O_3$ | 1.4 |
| $Gd_2O_3$ | 0.9 |
| $Y_2O_3$ | 0.1 |
| Others | 0.4 |

*Valence of cerium in the oxalate = 3

The ingredients were completely mixed dry by tumbling, and briquetted for ease of handling. The yield, in general, is a water-white optical grade glass free of seed and bubbles due to the fining action of the oxalates when held at a temperature of at least 1500°C or higher for a period of time of at least two hours or longer. With the above-mentioned preparation technique alumina crucibles of even slightly lower purity (99.3–99.7%) cannot be used, nor can the temperature of about 1540°–1460°C be exceeded even with the alumina crucibles of highest purity. The more refractory glasses were melted in either platinum alloy crucibles, or in tungsten crucibles under argon cover.

The compositions of some of the representative glasses formulated in the course of the experimental program are set forth in Table I.

Table I

Compositions of Representative Glasses (Weight Percent)

| Example | $SiO_2$ | BeO | $Al_2O_3$ | $Y_2O_3$ | $La_2O_3$ | $Nd_2O_3$ | $Ce_2O_3$ | R.E. Oxides | MgO | $ZrO_2$ | ZnO | CaO | Molar Ratio BeO/1st Group Oxides |
|---|---|---|---|---|---|---|---|---|---|---|---|---|---|
| 1 | 36.6 | 7.5 | 10.4 | | 33.1 | | | | | 12.5 | | | 3.0 |
| 2 | 25.8 | 6.9 | 13.5 | | 43.1 | | | | | | 10.8 | | 2.1 |
| 3 | 29.8 | 7.9 | 15.5 | 34.4 | | | | | | | 12.4 | | 2.1 |
| 4 | 24.9 | 8.9 | 18.1 | | 38.5 | | | | | | 9.6 | | 3.0 |
| 5 | 28.1 | 10.1 | 20.5 | 30.3 | | | | | | | 10.9 | | 3.0 |
| 6 | 19.7 | 8.2 | 16.7 | | 44.5 | | | | | | 11.1 | | 2.4 |
| 7 | 36.2 | 5.0 | 20.5 | 30.2 | | | | | 8.1 | | | | 1.5 |
| 8 | 38.2 | 7.9 | 10.8 | | 34.4 | | | | | | 8.6 | | 3.0 |
| 9 | 36.6 | 7.6 | 10.4 | | 33.1 | | | | | 12.5 | | | 3.0 |
| 10 | 38.1 | 7.4 | 10.9 | | | 34.5 | | | | | 8.6 | | 3.0 |
| 11 | 31.0 | 8.2 | 16.2 | 29.9 | | | | 8.6 | 6.4 | | | | 2.1 |
| 12 | 29.9 | 8.0 | 15.6 | 28.8 | | | | 8.4 | 3.1 | | 6.2 | | 2.1 |
| 13 | 30.2 | 8.1 | 15.8 | 29.1 | | | | 8.4 | | | | 8.7 | 2.1 |
| 14 | 29.5 | 7.9 | 15.4 | 28.5 | | | | 8.3 | | | 6.2 | 4.2 | 2.1 |
| 15 | 30.0 | 8.0 | 15.7 | 28.9 | | | | 8.4 | 2.1 | | 4.2 | 2.9 | 2.1 |
| 16 | 25.7 | 6.9 | 13.4 | | 7.2 | | 36.1 | | | | 10.7 | | 2.1 |
| 17 | 38.2 | 7.9 | 10.8 | | | | 34.6 | | | | 8.6 | | 3.0 |
| 18 | 31.0 | 7.3 | 12.0 | | 38.2 | | | | | | 9.6 | | 2.5 |
| 19 | 25.8 | 6.9 | 13.5 | | 43.1 | | | | | | 10.7 | | 2.1 |
| 20 | 31.9 | 4.4 | 18.0 | | | | 38.7 | | 7.1 | | | | 1.5 |
| 21 | 32.0 | 4.4 | 18.1 | | 38.4 | | | | 7.1 | | | | 1.5 |
| 22 | 24.6 | 3.8 | 15.6 | | 49.9 | | | | 6.2 | | | | 1.0 |
| 23 | 42.8 | 8.9 | 12.1 | 26.8 | | | | | | | 9.6 | | 3.0 |
| 24 | 29.2 | 9.1 | 12.4 | | 39.6 | | | | | | 9.9 | | 3.0 |
| 25 | 24.6 | 6.2 | 8.4 | | 26.7 | 26.7 | | | | | 6.7 | | 1.5 |
| 26 | 25.4 | 6.4 | 8.6 | | 27.6 | 28.5 | | | | 3.4 | | | 1.5 |
| 27 | 31.9 | 8.0 | 10.8 | | 34.6 | 7.1 | | | | 7.7 | | | 2.5 |
| 28 | 33.3 | 8.1 | 10.9 | | 36.1 | 3.6 | | | | 7.8 | | | 2.7 |

In order to characterize the various glasses, measurements of the density and Young's modulus of bulk samples as well as Young's modulus of mechanically drawn fibers were made. As a standard density measuring technique, the heavy-liquid-of-known density comparison procedure was used for samples with densities less than 3.00 gms/cm³ while the Archimedean method was employed for samples with densities greater than 3.00 gms/cm³.

Bulk samples for modulus measurement were prepared using the technique whereby the samples were drawn directly from the crucibles of molten glass into fused silica tubes previously dusted lightly with powdered magnesia. Controlled suction for pulling the sample into the tube was supplied by a hypodermic syringe. Since all of the experimental glasses had coefficients of thermal expansion at least higher than that of fused silica, the aspirated bars shrank away from the tube upon cooling and thus were readily removable.

Table II lists the values for a number of glasses made and tested in accordance with the teachings herein.

Table II

Glass Density, Young's Modulus and Specific Modulus

| Example | Density lb./in.³ | Young's Modulus psi × 10⁶ | Specific Modulus 10⁶ in. |
|---|---|---|---|
| 1 | 0.1318 | 16.7 | 127 |

Table II-continued
Glass Density, Young's Modulus and Specific Modulus

| Example | Density lb./in.$^3$ | Young's Modulus psi $\times 10^6$ | Specific Modulus $10^6$ in. |
|---|---|---|---|
| 2 | 0.1462 | 18.6 | 129 |
| 3 | 0.1322 | 20.9 | 158 |
| 4 | 0.1392 | 19.0 | 136 |
| 5 | 0.1265 | 21.0 | 166 |
| 6 | 0.1500 | 19.4 | 130 |
| 7 | 0.1193 | 20.3 | 170 |
| 8 | 0.1312 | 21.6 | 164 |
| 9 | 0.1317 | 17.7 | 134 |
| 10 | 0.1273 | 16.8 | 132 |
| 11 | 0.1277 | 19.0 | 149 |
| 12 | 0.1320 | 19.1 | 144 |
| 13 | 0.1277 | 17.8 | 139 |
| 14 | 0.1320 | 18.6 | 142 |
| 15 | 0.1289 | 18.5 | 144 |
| 16 | 0.1473 | 17.3 | 118 |
| 17 | 0.1312 | 18.1 | 138 |
| 18 | 0.1393 | 18.3 | 131 |
| 19 | 0.1457 | 19.2 | 132 |
| 20 | 0.1311 | 18.2 | 139 |
| 21 | 0.1340 | 18.0 | 134 |
| 22 | 0.1477 | 17.9 | 121 |
| 23 | 0.1239 | 19.1 | 154 |
| 24 | 0.1402 | 18.7 | 134 |
| 25 | 0.1570 | 19.3 | 123 |
| 26 | 0.1540 | 19.6 | 128 |
| 27 | 0.1345 | 19.3 | 144 |
| 28 | 0.1308 | 19.1 | 146 |

As is evident from the Tables, several of the formulations have proved to display extremely high modulus as well as modulus/density ratios superior to the best of glass compositions heretofore known. The particular formulation selected in a given application, however, will be dependent usually not only upon the properties of the end product but also upon the cost of the ingredients included. This is particularly true in commercial production.

Several of the glasses proved to be fiberizable. In order to evaluate these glasses, a "poor man's bushing" was used to prepare mechanically drawn fibers. The bushing comprises a 20 cm$^3$ platinum crucible with a reinforced bottom and central orifice. The orifice is formed by welding several thicknesses of platinum foil to the bottom of a normal platinum crucible until a bottom thickness of 3/16 in. is obtained. A central orifice .088 in. at top, .063 in. at bottom and 3/16 in. long in the crucible is made by taper reaming. Once the orifice is made, the crucible is filled with glass and introduced into a platform furnace having high temperature Super-Kanthal hairpin heating elements together with a first ring orifice to provide water cooling immediately below the crucible and a second ring orifice to cool the fiber with helium jets as it forms. The fibers were drawn at speeds of 4000–8000 feet/minute and yielded circular glass fibers having a diameter of approximately one mil. The fibers were then evaluated on an Instron CRE tester operated with a machine speed of 0.2 in./minute, a chart speed of 20 in./minute, a gage length of 5 in. and a full scale capacity of 1.0 lb. The specimens were held in air actuated clamps with flat rubber coated faces.

Table III lists the values for several glasses which were mechanically drawn into fibers.

Table III
Fiber Modulus

| Example | Young's Modulus psi $\times 10^6$ |
|---|---|
| 1 | 15.9 |
| 3 | 19.8 |
| 7 | 18.6 |
| 8 | 17.4 |
| 9 | 17.5 |
| 11 | 17.5 |
| 12 | 18.8 |
| 14 | 17.7 |
| 15 | 18.4 |
| 20 | 17.8 |
| 21 | 15.6 |
| 28 | 17.4 |

The particular formulation selected in a given application will be dependent, usually, not only upon the properties of the end product but also upon the cost of the ingredients included. This is particularly true in high volume commercial production.

While the invention has been described in connection with a number of particular preferred embodiments, they are considered illustrative only, and no limitation is intended thereby. Numerous substitutions, alterations and modifications will be evident to those skilled in the art within the true spirit and scope of the invention as set forth in the appended claims.

What is claimed is:

1. A glass composition having a Young's modulus of at least 16 million psi and a specific modulus of at least 110 million inches consisting essentially of, by weight, approximately:

20–43% $SiO_2$, 4–10% BeO, 8–21% $Al_2O_3$, 27–58% of at least one oxide selected from a first group consisting of $Y_2O_3$, $La_2O_3$, $Nd_2O_3$, $Ce_2O_3$ and mixtures thereof and 3–12% of at least one oxide selected from a second group consisting of MgO, $ZrO_2$ and ZnO, the molar ratio of BeO to the total content of said first group oxides being from 1.0 to 3.0.

2. A glass composition having a Young's modulus of at least 16 million psi and a specific modulus of at least 110 million inches consisting essentially of approximately, by weight:

20–43% $SiO_2$, 4–10% BeO, 8–21% $Al_2O_3$, 27–58% of at least one but not more than two oxides selected from a first group consisting of $Y_2O_3$, $La_2O_3$, $Nd_2O_3$ and $Ce_2O_3$ and 3–12% of not more than three oxides selected from a second group consisting of MgO, $ZrO_2$, and ZnO, the molar ratio of BeO to the total content of said first group oxides being from 1.0 to 3.0.

3. A glass composition having a Young's modulus of at least 16 million psi and a specific modulus of at least 110 million inches consisting essentially of, by weight, approximately:

20–43% $SiO_2$, 4–10% BeO, 8–21% $Al_2O_3$, 27–58% of at least one oxide selected from a first group consisting of $Y_2O_3$, $Nd_2O_3$, $Ce_2O_3$ and mixtures thereof and 3–12% of at least one oxide selected from a second group consisting of MgO, $ZrO_2$, ZnO and CaO, the molar ratio ratio of BeO to the total content of said first group oxides being from 1.0 to 3.0.

4. A glass composition having a Young's modulus of at least 16 million psi and a specific modulus of at least 110 million inches consisting essentially of approximately, by weight:

20–43% $SiO_2$, 4–10% BeO, 8–21% $Al_2O_3$, 27–58% of at least one but not more than two oxides selected from a first group consisting of $Y_2O_3$, $Nd_2O_3$ and $Ce_2O_3$ and 3–12% of not more than three oxides selected from a second group consisting of MgO, $ZrO_2$, ZnO, and CaO, the molar ratio of BeO to the total content of said first group oxides being from 1.0 to 3.0.

5. A fiberizable glass composition having a Young's modulus of at least 20 million psi and a specific modulus of at least 150 million inches consisting essentially of about, by weight:
30% $SiO_2$, 8% BeO, 16% $Al_2O_3$, 34% $Y_2O_3$ and 12% ZnO.

6. A fiberizable glass composition having a Young's modulus of at least 20 million psi and a specific modulus of at least 160 million inches consisting essentially of about, by weight:
36% $SiO_2$, 5% BeO, 21% $Al_2O_3$, 30% $Y_2O_3$ and 8% MgO.

7. A fiberizable glass composition having a Young's modulus of at least 20 million psi and a specific modulus of at least 160 million inches consisting essentially of about, by weight:
38% $SiO_2$, 8% BeO, 11% $Al_2O_3$, 34% $La_2O_3$ and 9% ZnO.

8. A fiberizable glass composition having a Young's modulus of at least 19 million psi and a specific modulus of at least 140 million inches consisting essentially of about, by weight:
31% $SiO_2$, 8% BeO, 16% $Al_2O_3$, 30% $Y_2O_3$, 9% $Ce_2O_3$ and 6% MgO.

9. A fiberizable glass composition having a Young's modulus of at least 19 million psi and a specific modulus of at least 140 million inches consisting essentially of about, by weight:
30% $SiO_2$, 8% BeO, 16% $Al_2O_3$, 29% $Y_2O_3$, 8% $Ce_2O_3$, 3% MgO and 6% ZnO.

10. A fiberizable glass composition having a Young's modulus of at least 18 million psi and a specific modulus of at least 140 million inches consisting essentially of about, by weight:
30% $SiO_2$, 8% BeO, 15% $Al_2O_3$, 29% $Y_2O_3$, 8% $Ce_2O_3$, 6% ZnO and 4% CaO.

11. A fiberizable glass composition having a Young's modulus of at least 16 million psi and a specific modulus of at least 120 million inches consisting essentially of, by weight:
37% $SiO_2$, 8% BeO, 10% $Al_2O_3$, 33% $La_2O_3$ and 12% $ZrO_2$.

12. A fiberizable glass composition having a Young's modulus of at least 18 million psi and a specific modulus of at least 140 million inches consisting essentially of, by weight:
30% $SiO_2$, 8% BeO, 16% $Al_2O_3$, 29% $Y_2O_3$, 8% $Ce_2O_3$, 2% MgO, 4% ZnO and 3% CaO.

* * * * *